Dec. 30, 1969    P. G. IVANCHICH    3,486,392
SHIFT INTERLOCK LEVER SYSTEM FOR CONTROLLING RATIO
CHANGES IN A MANUALLY CONTROLLED TRANSMISSION
Filed Jan. 25, 1968    4 Sheets-Sheet 1
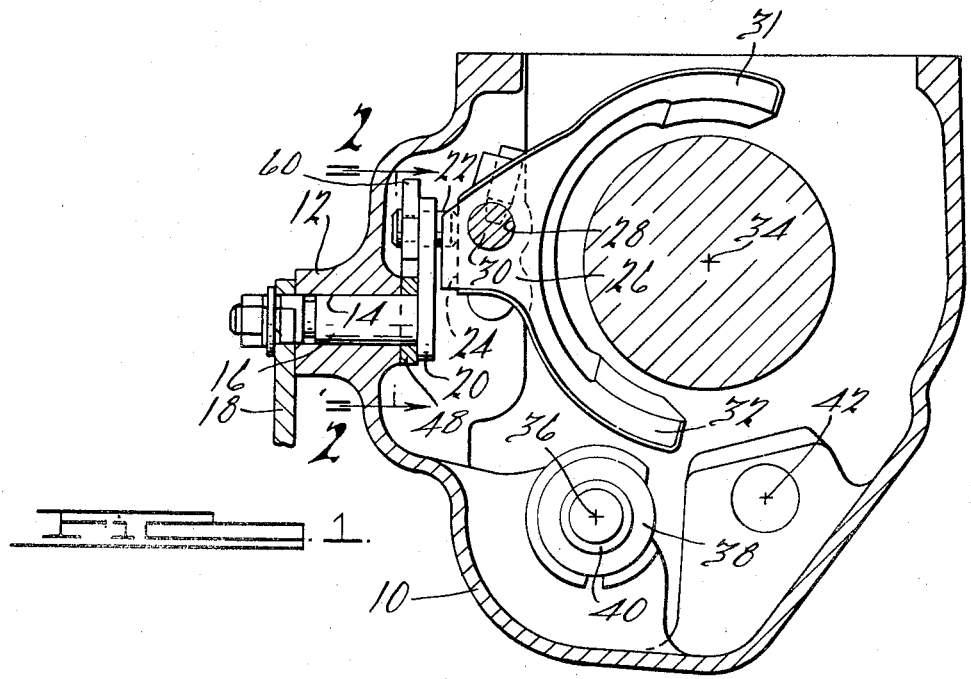
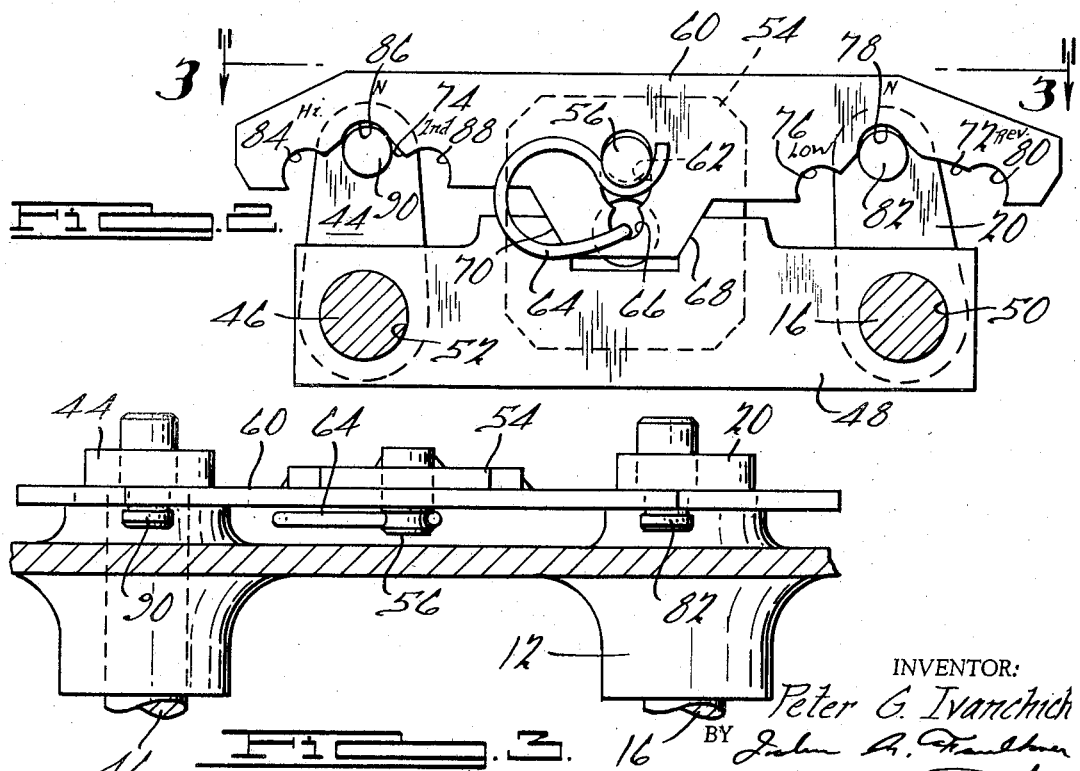
INVENTOR:
Peter G. Ivanchich
BY
ATTORNEYS

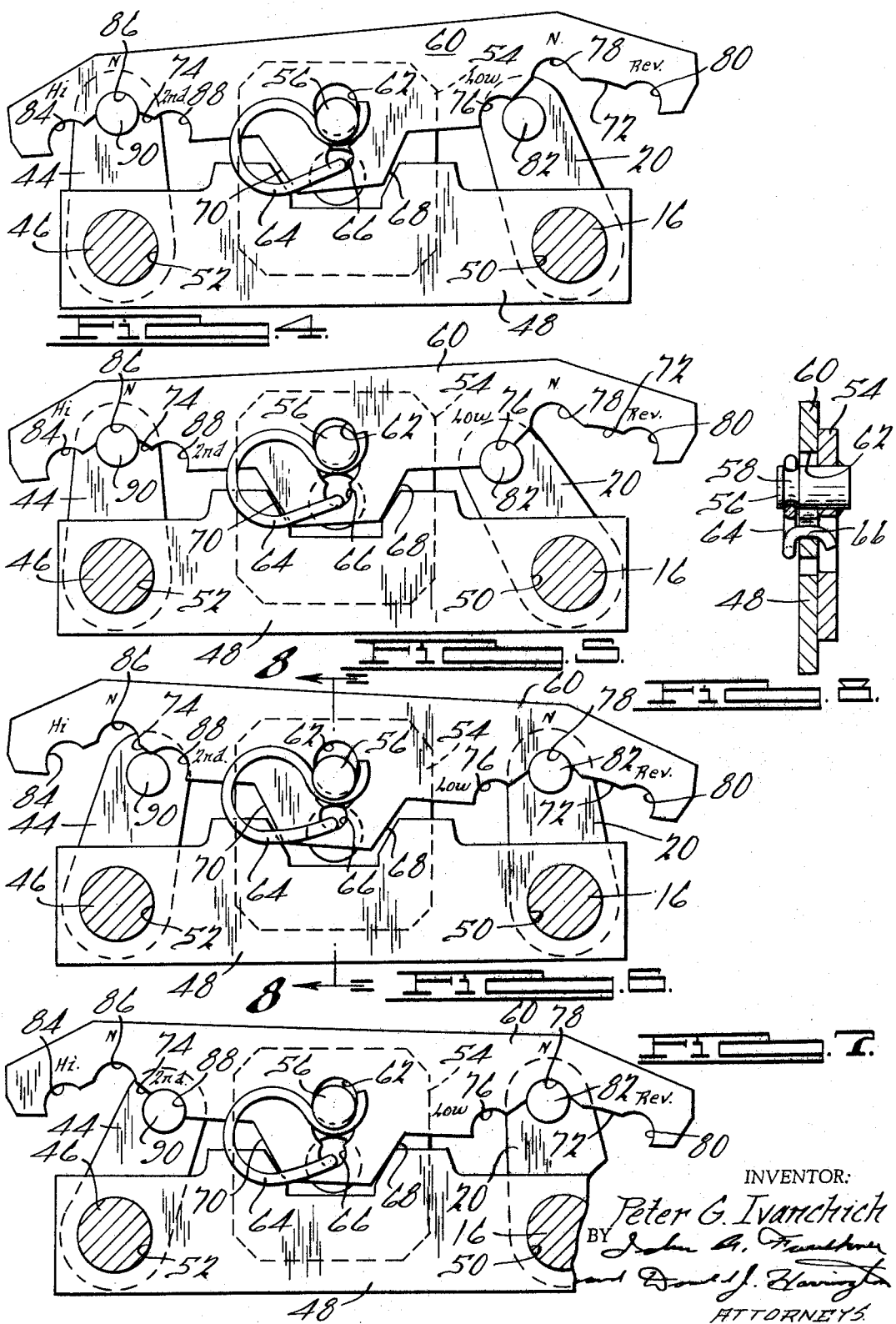

Dec. 30, 1969 P. G. IVANCHICH 3,486,392
SHIFT INTERLOCK LEVER SYSTEM FOR CONTROLLING RATIO
CHANGES IN A MANUALLY CONTROLLED TRANSMISSION
Filed Jan. 25, 1968 4 Sheets-Sheet 3
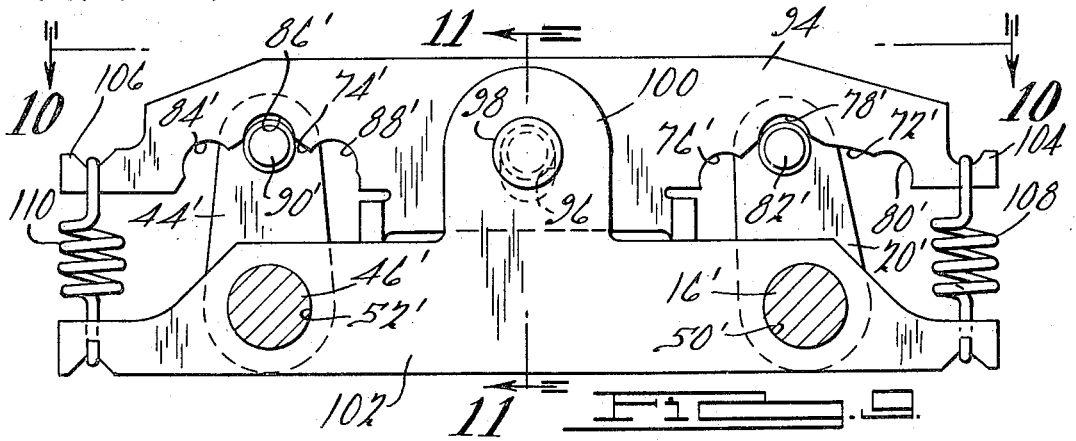
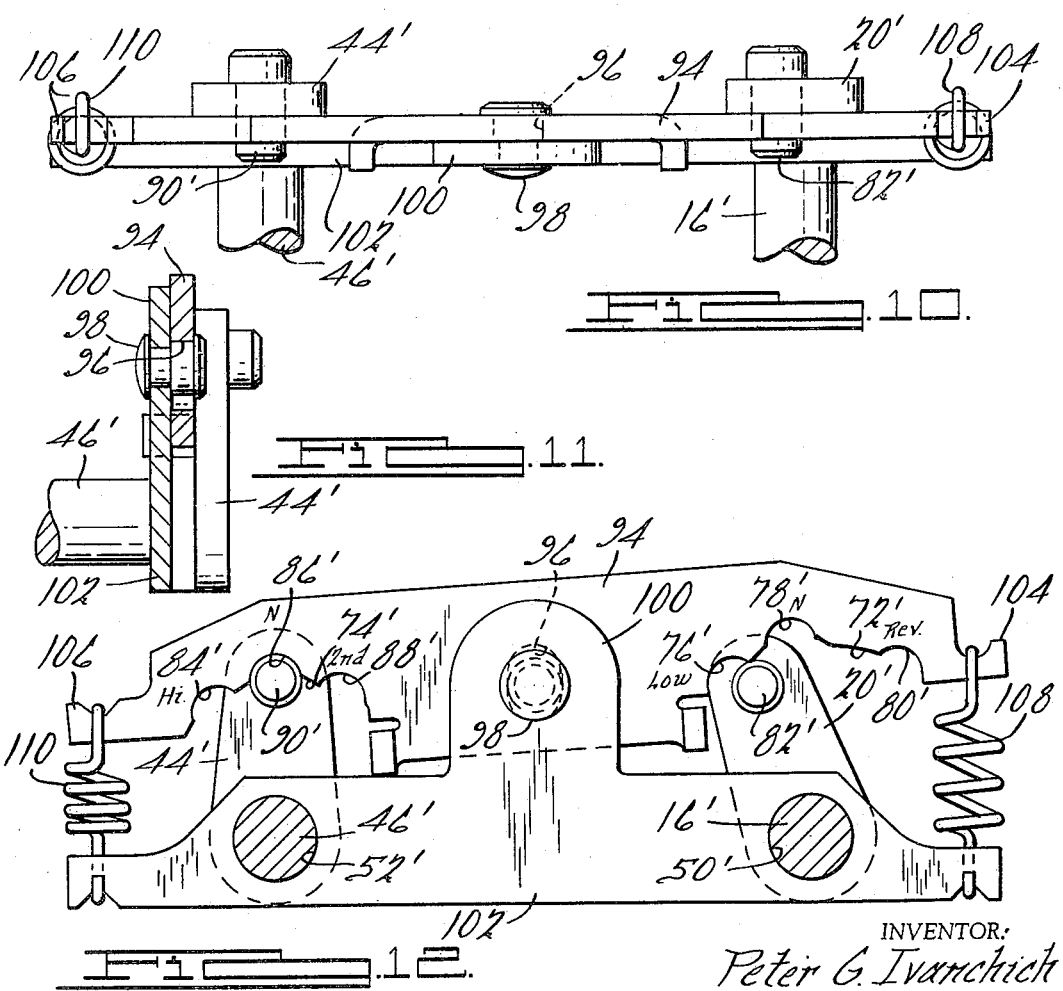
INVENTOR:
Peter G. Ivanchich
BY
ATTORNEYS.

INVENTOR:
Peter G. Ivanchich
BY
ATTORNEYS

United States Patent Office 3,486,392
Patented Dec. 30, 1969

3,486,392
SHIFT INTERLOCK LEVER SYSTEM FOR CONTROLLING RATIO CHANGES IN A MANUALLY CONTROLLED TRANSMISSION
Peter G. Ivanchich, Dearborn, Mich., assignor to Ford Motor Company, Dearborn, Mich., a corporation of Delaware
Filed Jan. 25, 1968, Ser. No. 700,639
Int. Cl. G05g 5/10
U.S. Cl. 74—477                                   11 Claims

ABSTRACT OF THE DISCLOSURE

This specification describes a manually controllable gearshift linkage for a geared power transmission mechanism in an automotive vehicle driveline. It is adapted especially to be used with transmission mechanisms having axially movable gearing or synchronizer clutch sleeves that can be shifted from one axial position to another to initiate ratio changes. An interlock lever assembly, comprising integrated cam portions, inhibits motion of one ratio-controlling element when its companion ratio-controlling element is shifted from a neutral position to a torque delivery position. This prevents simultaneous establishment of two torque delivery paths in the driveline, and it prevents unwanted shifting motion of the torque delivery elements of the driveline due to gear tooth thrust forces or inertia loads.

BRIEF SUMMARY OF THE INVENTION

The improvements of my invention are adapted to be used especially in a manually-controlled, multiple-ratio, power transmission mechanism of the type disclosed in U.S. Patent No. 3,150,530, which is assigned to the assignee of my invention. Reference may be had to that patent for the purpose of supplementing this disclosure.

In a vehicle power transmission mechanism of the type disclosed in Patent No. 3,150,530, the power input element of the gearing is connected drivably through a selectively engageable neutral clutch to the vehicle engine in the automotive vehicle driveline. A power output shaft is connected to the vehicle traction wheels through a suitable driveshaft and through a differential and axle assembly. A power output shaft has journalled thereon a plurality of power output gears that mesh with gear elements of a cluster gear assembly, the latter being journalled rotatably on an axis that is spaced from and parallel to the power output shaft.

A first synchronizer clutch structure is used to establish a driving connection between a low speed-ratio gear on the power output shaft and the power output shaft itself. The same clutch structure is used to establish a connection between the same power output gear and a reverse drive pinion thereby establishing a reverse torque delivery path. A second synchronizer clutch structure is used to establish an intermediate speed-radio condition and a high speed-ratio condition. In the former case, the clutch structure connects drivably an intermediate speed-ratio gear mounted for rotation on the power output shaft and the power output shaft itself. In the latter condition, intermediate speed-ratio drive is interrupted and a direct drive connection is made instead between the power input gear and the power output shaft thereby establishing a direct connection between the output clutch element of the neutral clutch and the power output shaft.

In each instance a synchronizer clutch sleeve moves in either of two axial directions to establish either of two drive conditions. The position intermediate the two corresponding sleeve positions is a neutral position in which both the intermediate and direct drive torque delivery paths are interrupted.

Two shift rails are mounted in the transmission housing in parallel disposition with respect to the axis of the power output shaft. On each rail is mounted a shift fork that is adapted to engage a peripheral groove on the associated synchronizer clutch sleeve. A manually operable lever is used for shifting the shift fork along the axis of the shift rail.

In this arrangement it is necessary to move one shift rail to the neutral position before the other shift rail can be adjusted to a driving position. Conversely, the other shift rail must be returned to the neutral position before a subsequent ratio shift can occur by shifting the first rail. If both shift rails were to be shifted to their respective driving positions simultaneously, gear clutching and a lock-up condition in the driveline would occur. To avoid this problem I have provided an interlock arrangement that will maintain one shift rail in the neutral position while the other is undergoing its ratio shifting function. The same interlock system is capable of preventing shifting movement of the other shift rail as the one shift rail undergoes its shifting function.

The interlock system includes a common lever that is mounted for tilting motion about a fixed, pivotal axis and for translation in a plane transverse to that pivotal axis. It includes intermediate cam elements that cooperate with cam followers carried by the levers that operate the respective shift rails.

I have accomplished this interlock characteristic without incurring a space penalty when my improved shift linkage mechanism is compared to conventional shift linkage mechanisms. The improvement of my invention can be adapted readily to conventional driveline systems while maintaining a high degree of interchangeability of parts. In addition to the interlock function, my improved structure provides a detent action to define the various operating positions of the shift levers. It also prevents gear "jump-out" due to shifting movement of the synchronizer sleeves upon a reversal in the direction of the gear thrust force.

BRIEF DESCRIPTION OF THE FIGURES OF THE DRAWINGS

FIGURE 1 shows in transverse, cross-sectional form a portion of a geared power transmission system which includes a shift fork of the type used in the structure of U.S. Patent No. 3,150,530.

FIGURE 2 is a cross-sectional view taken along the plane of section line 2—2 of FIGURE 1. The plane of FIGURE 2 is parallel to the axis of the torque transmitting gearing of FIGURE 1.

FIGURE 3 is a plan view of the structure of FIGURE 2 as seen from the plane of section line 3—3 of FIGURE 2.

FIGURES 4, 5, 6 and 7 are views that correspond to the view of FIGURE 2, although the elements thereof are shown in different operating positions.

FIGURE 8 is a cross-sectional view taken along the plane of section line 8—8 of FIGURE 6.

FIGURE 9 shows an alternate construction capable of carrying out the functions of the structure of FIGURES 1-8.

FIGURE 10 is a plan view as seen from the plane of section line 10—10 of FIGURE 9.

FIGURE 11 is a cross-sectional view taken along the plane of section line 11—11 of FIGURE 9.

FIGURES 12, 13, 14 and 15 are views that correspond to FIGURE 9, although the operating elements thereof are shown in different positions.

GENERAL DESCRIPTION OF THE INVENTION

Figure 13:
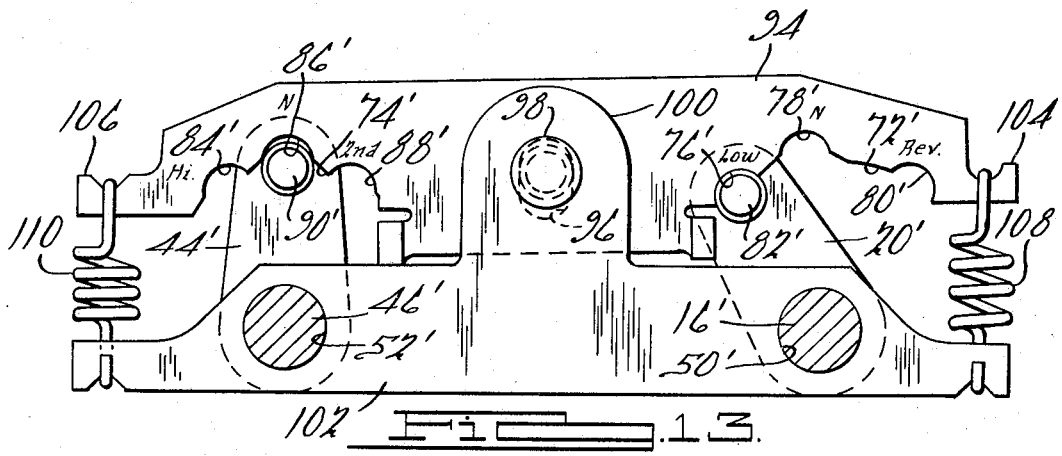
Figure 14:
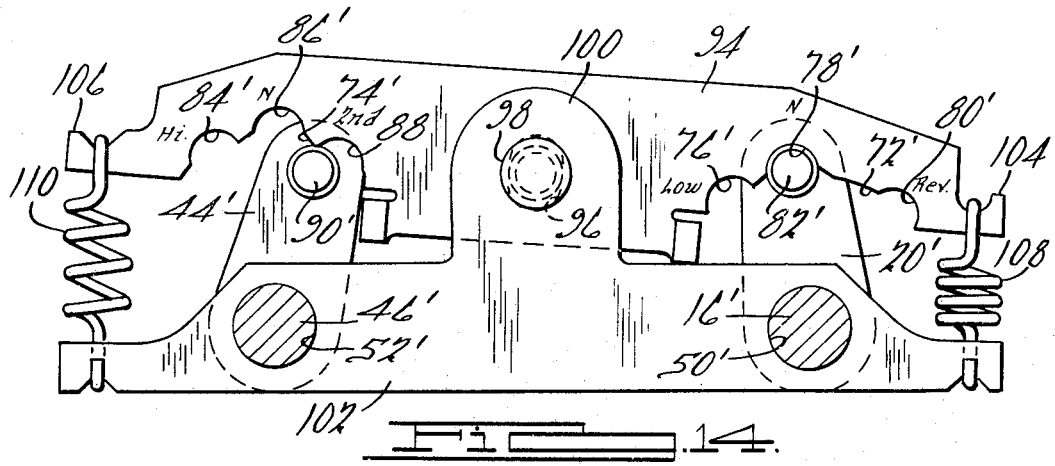

In FIGURE 1 numeral 10 designates a power transmission housing which may be bolted to the engine block of an internal combustion engine. On one side of the housing 10 there is formed a boss 12 having an opening 14 which receives a rotary shaft 16. The outboard end of the shaft 16 is connected to a driver-operated control lever 18. The inboard end of the shaft 16 is connected directly to a shift lever 20, which extends radially with respect to the axis of the shaft 16. Lever 20 carries at its radially outward end a shift finger 22 which registers with a vertical groove 24 formed in collar 26. Opening 28 in collar 21 receives a shift rail 30, which is supported by the housing 10 in the usual fashion.

A pair of shift fingers 31 and 32 is carried by collar 26. The terminal portions of the fingers 31 and 32 engage a peripheral groove in a synchronizer clutch sleeve, not shown. This in turn is adapted for rotation about the axis 34 of the power output shaft for the transmission.

A cluster gear assembly is mounted for rotation about a countershaft axis 36. The cluster gear assembly comprises multiple, external gear teeth formed on sleeve 38 which is journalled on countershaft 40. This in turn is supported by the transmission housing. A reverse drive pinion is mounted for rotation about a third axis 42. The reverse pinion meshes continuously with the cluster gear assembly and is adapted to engage a low-and-reverse gear, which is mounted for rotation about the axis 34 when the reverse-and-low synchronizer clutch structure is shifted to the reverse drive position.

A corresponding shift lever is provided for the other shift rail not shown. Both shift levers can be seen, however, in FIGURE 2 where the other shift lever is identified by reference character 44. It is mounted at the inboard end of rotary shaft 46, which extends outwardly from a boss similar to the one shown at 12 in FIGURE 1.

A cam plate 48 is located inside the housing 10 adjacent the inner surfaces of the boss 12. It is formed with a pair of openings 50 an 52 through which the shafts 16 and 46 extend. At the central region of the cam plate 48 there is fixed, as seen in FIGURE 8, a support plate 54. This carries a reaction pin 56 which protrudes across the plane of the cam plate 48 as seen at 58. Situated in the plane of the cam plate 48 is a movable cam plate 60 having a central recess 62. The recess 62 is elongated to receive the end 58 of the reaction pin 56 and to permit shifting movement of the cam plate 60 in the plane of the plate 48. A spring 64 is interposed between the movable cam plate 60 and the reaction pin 56, one end thereof engaging the end 58 and the other end engaging the base 66 of the opening 62. This tends to bias normally the cam plate 60 in a downward direction.

Cam plate 60 is formed with a pair of cam surfaces 68 and 70 which register with cooperating cam surfaces formed on the stationary cam plate 48. When the cam plates are in the relative positions shown in FIGURE 2, one is situated centrally with respect to the other.

The right-hand side of the cam plate 60, as viewed in FIGURE 2, is provided with an arcuate recess 72 and a corresponding arcuate recess 74 is formed at the left-hand side thereof. Recess 72 is characterized by three cam recesses 76, 78 and 80. These are arcuately spaced and define operating positions that form a cam follower 82 carried by the shift lever 20 at its outward end. When the follower 82 registers with the cam recess 78, the lever 20 is positioned in the so-called neutral position. When it is in registry with the cam recess 76, lever 20 is in the so-called low speed ratio position. When the follower 82 registers with the cam recess 80, shift lever 20 is in the reverse drive position.

Recess 74 also is provided with three cam recesses, as indicated at 84, 86 and 88. These register with cam follower 90 carried by shift lever 44. When follower 90 is in recess 86, lever 44 is in the neutral position. When follower 90 registers with cam recess 84, lever 44 is in the high speed ratio, direct-drive position. When cam follower 90 registers with recess 88, lever 44 is in the second underdrive ratio position.

When the lever 20 is shifted to the low range position, the cam element 60 shifts in a counterclockwise direction, as indicated in FIGURE 4, with the cam follower 90 serving as a pivot point. The cam surfaces 68 and 70 move out of registry with the cooperating cam surfaces in the cam element 48. The elongated opening 72 accommodates the relative motion of the cam element 60 with respect to the pin 56.

After the shift lever 20 reaches the low range position in which cam follower 82 registers with recess 76, the movable lever 20 will have adjusted the low speed ratio synchronizer mechanism to the low speed drive position. This condition is illustrated in FIGURE 5, It is impossible, when the lever 20 assumes the position shown in FIGURE 5, for the lever 44 to move from the neutral position shown. In order to effect movement of the lever 44 to the second speed ratio position, it is necessary to return the lever 20 to the neutral position. This is shown in FIGURE 6. During movement of the lever 44, the movable cam element 60 pivots about the cam follower 82 in a clockwise direction as the cam surfaces 68 and 70 move out of registry again with the cooperating cam surfaces in the fixed cam element 48. Finally, when the lever 44 assumes the position shown in FIGURE 7, with the cam follower 90 registering with the recess 88, the transmission system is conditioned for second speed ratio operation. The interlock system will prevent movement of the lever 44 to the high speed ratio position when the lever 20 is in any ratio position except the neutral position. The same tilting action of the movable cam element 60 occurs when the shift lever 44 moves toward the high speed position as that which was described in the foregoing paragraphs with reference to movement of the lever 44 in a clockwise direction.

Although the centrally disposed cam surfaces 68 and 70 move out of registry with respect to the cooperating cam surfaces in the fixed element 48, it is nevertheless effective to prevent inadvertent translation of the movable cam element 60 in the direction of the axis 34.

An alternate construction is shown in FIGURES 9–15. It comprises a movable cam element 94 which is formed with an elongated opening 96 through which is received a reaction pin 98. This is carried by a boss 100 formed on a relatively stationary interlock element 102.

Element 102 can be apertured to receive the rotary shafts 16' and 46'. These shafts correspond, respectively, to the shafts 16 and 48 in the previous embodiment. Other elements in the second embodiment that have counterpart elements in the first embodiment have been indicated by similar reference characters, although prime notations have been added.

Interlock element 102 is held fast with respect to the movable cam element 94. The two outboard ends 104 and 106 for the cam element 94 are urged toward the fixed interlock element 102 by coil springs 108 and 110, respectively. These springs perform the function of the spring 64 in the previous embodiment. The elongated opening 96 will accommodate movement therein of the pin 98 as the movable element 94 oscillates angularly as well as reciprocates in the plane of the member 102. This compound motion is indicated in FIGURES 12, 13, 14 and 15.

Figure 15:
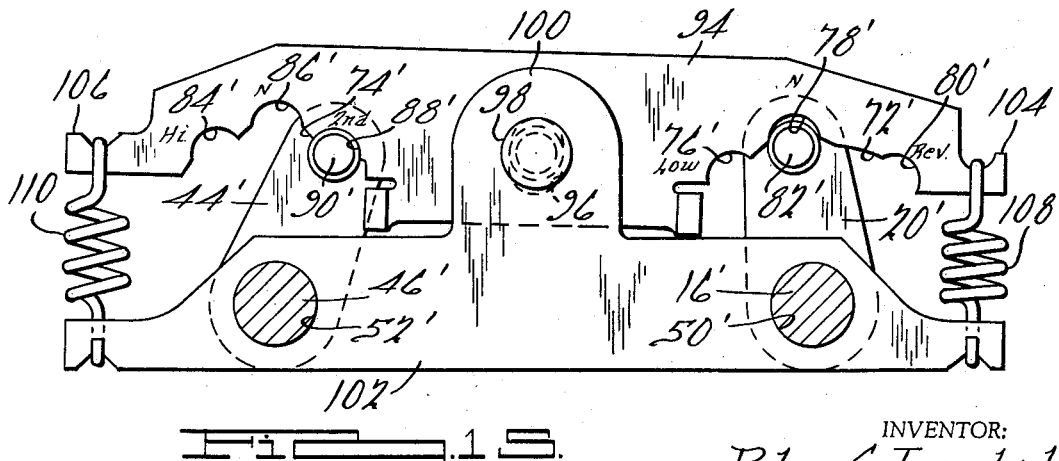

In FIGURE 12 the shift lever 44' is in the neutral position and the shift lever 20' is shifting toward the low range position from the neutral position. At that time the cam element 94 rocks in a counterclockwise direction and moves away from interlock element 102 in a plane common to the plane of element 102. When the shift lever assumes the position shown in FIGURE 13, the transmission mechanism is conditioned for low speed ratio operation. At that time it is impossible to move the shift lever 44'. This can be done only if the shift lever 20' is returned to the position shown in FIGURE 14. As the lever 44' is rotated in a clockwise direction, as viewed in FIGURE 14, the cam element 94 undergoes translation and rotary motion. The second speed ratio condition is illustrated in FIGURE 15 where the shift lever 44' has completed its motion so that the cam follower 90' registers with the recess 88'. The pressure of the cam surfaces 68 and 70 on the cam plate 70 of the embodiment of FIGURES 1 to 7 prevents a teter-totter effect as one end of cam plate 60 is carried by one of the shift levers. This effect is not present in the embodiment of FIGURES 9 to 15, however, serious rocking motion is prevented by the tandem springs 108 and 110.

Having thus described preferred forms of my invention, what I claim and desire to secure by U.S. Letters Patent is:

1. In an interlock lever system for a manually controlled, geared power transmission mechanism for delivering torque from a driving member to a driven member, means for shifting torque delivery elements of said gearing from a first neutral position to a second operating position, the direction of motion of said torque delivery elements being in the direction of the axis of said driven member, said shifting means comprising a pair of shift rails, said shift rails being situated on an axis that is parallel to the axis of said driven member, a shift fork supported by each shift rail, said shift fork being adapted to be shifted in the direction of the axis of its associated shift rail, a pair of shift levers mounted for oscillation in a plane that is generally parallel to the axis of said driven member, a cam follower carried by one end of each shift lever, a movable cam element having integrated, arcuately spaced, cam recesses situated on either side of a central pivotal axis, means for pivoting said movable cam element for oscillating motion about said pivotal axis and for limited translatory motion in a plane parallel to the plane of motion of said shift levers, a relatively stationary interlock element, a lost motion connection between said interlock element and said cam element, arcuately spaced detent openings in said cam recesses, the cam followers on said shift levers being selectively engageable with said detent openings, one of said cam followers engaging one cam recess to move said movable cam element with translatory motion with respect to said interlock element as it is shifted from a neutral position to one of its operating positions, the companion shift lever with its cam follower acting as a fulcrum point whereby tilting action of said movable cam element occurs, and spring means for normally maintaining said cam followers and cam recesses in registry.

2. In an interlock lever system for a manually controlled, geared power transmission mechanism for delivering torque from a driving member to a driven member, means for shifting torque delivery elements of said gearing from a first neutral position to a second operating position, the direction of motion of said torque delivery elements being in the direction of the axis of said driven member, said shifting means comprising a pair of shift rails said shift rails being situated on an axis that is parallel to the axis of said driven member, a shift fork supported by each shift rail, said shift fork being adapted to be shifted in the direction of the axis of its associated shift rail, a pair of shift levers mounted for oscillation in a plane that is generally parallel to the axis of said driven member, a cam follower carried by one end of each shift lever, a movable cam element having integrated, arcuately spaced, cam recesses situated on either side of a central pivotal axis, means for pivoting said movable cam element for oscillating motion about said pivotal axis and for limited translatory motion in a plane parallel to the plane of motion of said shift levers, a relatively stationary interlock element, a lost motion connection between said interlock element and said cam element, said movable cam element and said interlock element having engageable parts whereby displacement of said movable cam element in the direction of the axis of said driven member is prevented while tilting motion about the pivotal axis of said movable cam element is accommodated, arcuately spaced detent openings in said cam recesses, the cam followers on said shift levers being selectively engageable with said detent openings, one of said cam followers engaging one cam recess to move said movable cam element with translatory motion with respect to said interlock element as it is shifted from a neutral position to one of its operating positions, the companion shift lever with its cam follower acting as a fulcrum point whereby tilting action of said movable cam element occurs, and spring means for normally maintaining said cam followers and cam recesses in registry.

3. The combination as set forth in claim 1 wherein the pivoting means for said movable cam element includes fixed surfaces, the intermediate region of said cam element having cam surfaces that register with the fixed surfaces of said pivoting means whereby displacement of said movable cam element in the direction of the axis of said driven member is inhibited as tilting movement of said movable cam element occurs.

4. The combination as set forth in claim 1 wherein said movable cam element and said interlock element have interengageable parts, one received within the other, said parts having a lost motion spacing therebetween whereby a limited displacement of said movable cam element in a plane parallel to the plane of motion of said shift levers is accommodated.

5. The combination as set forth in claim 2 wherein said movable cam element and said interlock element have interengageable parts, one received within the other, said parts having a lost motion spacing therebetween whereby a limited displacement of said movable cam element in a plane parallel to the plane of motion of said shift levers is accommodated.

6. The combination as set forth in claim 3 wherein said movable cam element and said interlock element have a lost motion spacing therebetween whereby a limited displacement of said movable cam element in a plane parallel to the plane of motion of said shift levers is accommodated.

7. The combination as set forth in claim 1 wherein each cam recess has three operating positions, one operating position for each cam recess being defined by a first detent opening, and two other detent openings in each recess on either side of said first detent opening defining two other operating positions for the associated shift lever.

8. The combination as set forth in claim 2 wherein each cam recess has three operating positions, one operating position for each cam recess being defined by a first detent opening, and two other detent openings in each recess on either side of said first detent opening defining two other operating positions for the associated shift lever.

9. The combination as set forth in claim 3 wherein each cam recess has three operating positions, one operating position for each cam recess being defined by a first detent opening, and two other detent openings in each recess on either side of said first detent opening defining two other operating positions for the associated shift lever.

10. The combination as set forth in claim 4 wherein each cam recess has three operating positions, one operating position for each cam recess being defined by a first detent opening, and two other detent openings in each recess on either side of said first detent opening defining two other operating positions for the associated shift lever.

11. The combination as set forth in claim 5 wherein each cam recess has three operating positions, one operating position for each cam recess being defined by a first detent opening, and two other detent openings in each recess on either side of said first detent opening defining two other operating positions for the associated shift lever.

References Cited

UNITED STATES PATENTS 2,299,889   10/1942   Fishburn _____ 74—477
3,264,894   8/1966   Popovich et al. _____ 74—477

MILTON KAUFMAN, Primary Examiner